Dec. 30, 1969           W. SHULTZ ETAL           3,486,209
                          TURRET LATHE
                       Filed Nov. 22, 1967
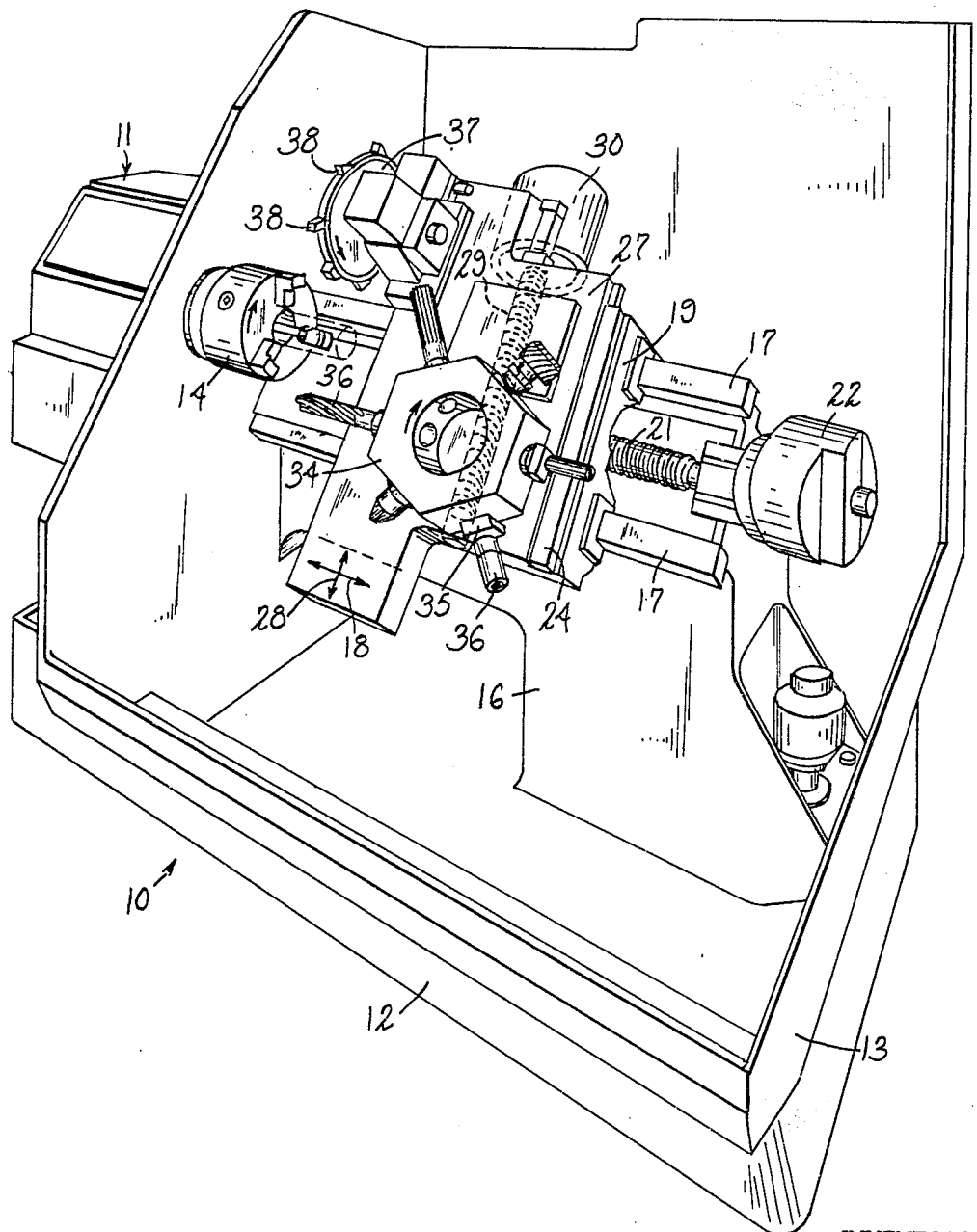
INVENTORS
Robert S. Jones
Walter Shultz
BY
DeLio and Montgomery
ATTORNEYS 3,486,209
TURRET LATHE
Walter Shultz, Newport, N.H., and Robert S. Jones, Springfield, Vt., assignors to Textron, Inc., Providence, R.I., a corporation of Rhode Island
Filed Nov. 22, 1967, Ser. No. 685,080
Int. Cl. B23b 3/16, 9/00
U.S. Cl. 29—27                                             4 Claims

ABSTRACT OF THE DISCLOSURE

A combination turret lathe, comprising first means for supporting a workpiece, second means for holding turning tools, third means for holding end working tools, said second and third means mounted on a first slide in fixed spacial relationship to each other, said first slide mounted for movement on a second slide, said second slide mounted for movement on support means, and second and third means positioned on said first slide to present tools to a workpiece supported by said first means.

---

This invention relates to metal turning machine tools and more particularly to a new and improved form of a turret lathe.

In present-day turret lathes, the turning tools are mounted on one pair of slides and the end working tools are mounted on another slide that is independent of the first pair. Although the standard turret lathe is very versatile, it has been a difficult machine to use with numerical controls because of the use of the multiple slides. The standard turret lathe is essentially two machines on a common bed, a turning lathe and a horizontal turret drill. As a consequence, it can be extremely productive when fully utilized under numerical controls and is capable of presenting two independently controlled tools to the work simultaneously, compared to other machine tools presenting only one at a time. This capability has not heretofore been fully utilized because of programming difficulties encountered wtih present-day available numerical controls. Today, even four and five-axis control systems are concerned with moving only one active tool. It has been found that the versatility of the standard turret lathe provides additional difficulties, if both are used simultaneously, or even independently of each other. The hazard of tooling interferences and clearances is a nerve-wracking problem as well as a difficult problem for programmers to solve. Even to this day, it is exceedingly difficult to program a computer such that the two independent tools will not interfere with each other during operation of the machine. This has caused innumerable problems, due to smash-up of the interfering tools.

As a result of the above, 2-plane machine mock-ups have come into use and visual checks are made while programming. The program is then rechecked on the machine in a dry run, where the machine is operated with the spindle stopped and the motions traversing at reduced speed while the operator anxiously monitors clearances and procedures.

In view of the foregoing difficulties, it is believed that a new approach should be taken to these problems, particularly since the utilization of the standard turret lathe flexibility is so small and the hazards and programming problems so predominant.

This invention, therefore, provides a combined turret lathe wherein the turning tools and the end working tools are mounted on a pair of slides in a fixed spacial relationship, so that the clearances between the tools are unchanging. Preferably, the turning tools are positioned on a rotatable holder so that it can present any one of the (six or more) tools to the work. Also preferably, the end working tools are supported in a rotatable holder so that it may present any one of six sets of tools.

In the preferred form of this invention, the axes of these turrets (or rotatable tool holders) are set at right angles to each other so that meshing is avoided. Either or both turrets can index within their own fixed clearance envelopes and be entirely predictable as to interferences. This allows the same machine functions on one pair of slides that has previously required at least one extra slide motion.

Accordingly, it is an object of this invention to provide a new and improved combined turret lathe.

Another object of this invention is to provide a new and improved turret lathe which is easily adaptable to numerical control.

Still other objects of this invention will in part be obvious and will in part appear hereinafter.

The invention accordingly comprises the features of construction, combinations of elements and arrangements of parts which will be exemplified in the constructions hereinafter set forth and the scope of the invention will be indicated in the claims.

For a fuller understanding of the invention, reference is had to the following description, taken in connection with the accompanying drawings, in which the figure is a perspective of a combined turret lathe according to this invention.

In the figure there is disclosed a combined turret lathe 10. Numerical controls (not shown) may be used for automatically operating the machine 10. The machine 10 comprises a headstock 11 and a bed having a base member 12 and a support 16. At 13 there is shown a metal splash guard and a spindle and chuck arrangement is shown at 14 for holding and rotating a workpiece in a well known manner. A motor (not shown) is provided to rotate the workpiece.

Also positioned on the member 16 is a pair of rails 17 on which is guidedly mounted a slide 19 movable in the direction indicated by an arrow 18. The slide 19 is positioned by a lead screw shown at 21 which is positioned by a motor 22 controlled from the numerical controller.

Positioned atop slide 19 is a second pair of rails 24 in which is positioned a slide 27 movable in the direction as shown by an arrow 28. The slide 27 is positionable by a lead screw 29 driven by a motor shown at 30. The motor 30 is also controlled from the numerical controller in a well known manner.

On top of slide 27 is positioned a hexagonal turret 34 indexable in a well known manner by signals provided from the controller 11, having means shown at 35 for holding a plurality of tools generally shown at 36. The turret is used to hold tools which operate on the end of the workpiece in a well known manner. Also positioned on slide 27 is a turning tool holder shown at 37 which is preferably of the rotatable type, such that it may present any one of a number of tools shown at 38 to engage the side of the workpiece. The tools 38 are indexable by signals provided to the rotatable tool holder from the numerical controller.

In the preferred embodiment of this invention, the axis of turret 34 and the axis of the tool holder 37 are positioned at right angles to each other so that meshing of the tools carried by each tool holder is avoided. Either or both turrets or tool holders can index within their own fixed clearance envelopes and be entirely predictable as to interferences. Although, in the preferred embodiment, the axis of the turret 34 and the tool holder 37 are at right angles to each other, it should be understood that they can be at any other angle (i.e., 45° or 60° to each other), as long as their tool envelopes do not interfere with one another.

As another feature of this invention, the machine is arranged in the preferred form, such that the slides are positioned at an angle of about 35°–75° with respect to the base of the bed 12 which would rest on a suitable support such as a floor. With this configuration, the resulting machine permits good chip disposal which has long been a severe problem with automatic equipment.

It should be understood that, if desired, the slides could be aligned in parallel to the base of the bed. It should also be understood that means could be provided to rotate the slides and the respective tool holders positioned on top of the slides to change the angle of the slides with respect to the base of the bed 12.

It will thus be seen that the objects set forth above, among those made apparent from the preceding description, are efficiently attained and since certain changes may be made in the above construction without departing from the spirit and scope of the invention, it is intended that all matter contained in the foregoing description and shown in the accompanying drawings shall be interpreted as illustrative and not in a limiting sense.

What is claimed is:

1. A combination turret lathe, comprising a base, first means on said base for supporting a workpiece, first turret means for holding turning tools, second turret means for holding end working tools, said first and second turret means mounted on a first slide in permanent fixed spacial relationship to each other, in which the axes of said first and second turret means are set at an angle to each other, such that their tool envelopes do not interfere with one another, said first slide mounted for movement on a second slide, said second slide mounted for movement on support means on said base, and said first and second turrt means positioned on said first slide to present tools to a workpiece supported by said first means.

2. A combination turret lathe in accordance with claim 1, in which said second means comprises a rotatable tool holder, in which the axes of the first turret means and the second turret means are set at substantially 90° angles to one another.

3. A combination turret lathe in accordance with claim 1, in which the support means provides means for positioning the first slide at an angle with respect to the base of the machine tool supporting the turret lathe on the floor in order to provide for chip disposal.

4. A combination turret lathe in accordance with claim 2, in which the support means provides means for positioning the first slide at an angle with respect to the base of the machine supporting the turret lathe on the floor.

References Cited

UNITED STATES PATENTS

| | | | |
|---|---|---|---|
| 571,402 | 12/1968 | Schneider | 82—36.1 |
| 2,368,736 | 2/1945 | Wyrick | 82—36.1 |
| 2,966,721 | 1/1961 | Bordignon | 29—27 |

FRANCIS S. HUSAR, Primary Examiner.

U.S. Cl. X.R.

29—36, 54, 564

PO-1050
(5/69)

UNITED STATES PATENT OFFICE
CERTIFICATE OF CORRECTION

Patent No. 3,486,209      Dated December 30, 1969

Inventor(s) Walter Shultz and Robert S. Jones

It is certified that error appears in the above-identified patent and that said Letters Patent are hereby corrected as shown below:

Column 4, line 4, "turrt" should read --turret--; column 4, line 7, cancel "in which said second means comprises a rotatable tool"; column 4, line 8, delete "holder".

SIGNED AND
SEALED

JUN 30 1970

(SEAL)
Attest:

Edward M. Fletcher, Jr.
Attesting Officer

WILLIAM E. SCHUYLER, JR.
Commissioner of Patents